United States Patent [19]

Nye et al.

[11] 3,821,802

[45] June 28, 1974

[54] TAPE MOVEMENT INDICATION MEANS AND SIGNALLING DEVICE

[75] Inventors: William M. Nye; Stanley W. Jones, both of Bellevue, Wash.

[73] Assignee: Lanier Electronic Laboratory, Inc., Atlanta, Ga.

[22] Filed: Sept. 7, 1972

[21] Appl. No.: 286,870

Related U.S. Application Data

[63] Continuation of Ser. No. 60,285, Aug. 3, 1970, abandoned.

[52] U.S.Cl. ............... 360/72, 179/100.1 DR, 360/71

[51] Int. Cl. ..... G11b 27/16, G11b 15/6, G11b 15/18

[58] Field of Search ........... 179/100.2 S, 100.2 MD, 179/100.2 R, 100.2 B, 100.1 DR, 100.1 PS, 100.1 TC; 178/6.6 A; 310/49 R

[56] References Cited

UNITED STATES PATENTS

| | | | |
|---|---|---|---|
| 3,254,245 | 5/1966 | Staar | 310/49 R |
| 3,423,743 | 1/1969 | Silverman | 179/100.2 MD |
| 3,467,790 | 9/1969 | Bolick, Jr. | 179/100.1 DR |
| 3,467,791 | 9/1969 | Bolick, Jr. | 179/100.1 DR |
| 3,482,751 | 4/1968 | Bolick, Jr. | 179/100.2 R |
| 3,573,393 | 4/1971 | Blackie et al. | 179/100.2 MD |
| 3,706,859 | 12/1972 | Nye | 179/100.2 R |

*Primary Examiner*—James W. Moffitt
*Assistant Examiner*—Alfred H. Eddleman
*Attorney, Agent, or Firm*—Jones, Thomas & Askew

[57] ABSTRACT

An optical sensing system for a recorder-transcriber detects the passing of evenly spaced holes in a recording tape and transmits signals to "up" and "down" stepping motors which drive an indicator through a differential drive assembly. Dictate-forward and reverse controls and secretary-forward and reverse controls are provided and are coupled to the optical sensing means in a manner such that passing of a hole in the secretary-forward or dictate-reverse directions will energize the "down" stepping motor and passing of the holes in the secretary-reverse or dictate-forward direction will energize the "up" stepping motor.

A signalling device for indicating a percent of capacity of a recorder-transcriber includes a cam actuated signal producing switch in which the cam is driven by a pin attached to a cam driver that is coupled to the differential assembly. The pin may be seated in slots of various lengths. Each slot corresponds to a different quantity recorder-transcriber capacity and provides a lost-motion connection wherein the signal generated is terminated only after the pin has traversed the slot.

19 Claims, 8 Drawing Figures

WILLIAM M. NYE
STANLEY W. JONES
INVENTORS

BY Seed, Berry & Dowrey
ATTORNEYS

WILLIAM M. NYE
STANLEY W. JONES
INVENTORS

BY Seed, Berry & Dowrey
ATTORNEYS

INVENTORS.
WILLIAM M. NYE
BY STANLEY W. JONES

Seed, Berry & Dowrey
ATTORNEYS

TAPE MOVEMENT INDICATION MEANS AND SIGNALLING DEVICE

This is a continuation of application Ser. No. 60,285, filed Aug. 3, 1970, now abandoned.

BACKGROUND OF THE INVENTION

1. Field of the Invention

This invention pertains to counting and/or signalling devices for recorder-transcribers of the type employing an endless tape on which dictation and transcription may be accomplished simultaneously.

2. Description of the Prior Art

In recorder-transcribers of the type in which simultaneous dictation and transcription may be accomplished, such as shown in the patent to Nye, U.S. Pat. No. 2,988,604, it is often necessary to know at any particular moment the amount of dictated but untranscribed tape in the recorder-transcriber or the total amount of tape transcribed during any particular time interval. Various types of counting techniques have heretofore been employed to accomplish these objectives but none has been satisfactory.

In general the prior art techniques have fallen into two categories: (1) The first category employed a counter that was energized by some form of drive mechanism that mechanically measured the movement of the tape over a roller or the like. In counters of this category slippage and stretching of the tape introduced inaccuracies. The counters also frequently employed expensive and complicated drive mechanisms which resulted in servicing difficulties particularly where skilled servicemen were unavailable. (2) The counters of the second category measured time such as by a conventional D.C. or A.C. clock motor the energization of which was controlled by the secretary or dictator's tape directional control signals. A difficulty with these counters was that the clock motor was only accurate during long periods of rotation and produced inaccuracies due to its inertia when constantly started and stopped at short intervals as was common with dictation and transcription.

In an endless tape dictation system both the dictator and transcriber (secretary) frequently reverse the tape. It was necessary therefor to eliminate repetitious counting of previously listened to tape. In one type of counter, which utilized bidirectional stepping motors to drive the indicator, one bidirectional motor would be driven "up" when the secretary was transcribing and "down" when reversing. The other bidirectional motor would be driven "up" when the dictator was reversing and "down" when dictating. In other types of counters the repetition was eliminated by unidirectional bin switches which permitted signals to pass to the counter only when uncounted dictated or uncounted transcribed tape was passing for the first count.

In prior art dictation systems, when the dictator used a predetermined percent of capacity of a recorder-transcriber, i.e., the quantity of dictated but untranscribed tape in the recorder-transcriber, a signal would be generated by electrically completing a circuit. While an electrical technique was adequate more versatility could be built into the recorder-transcriber if the signalling was obtained by a mechanical movement of sufficient power to actuate a switch for example.

SUMMARY OF THE INVENTION

An object of this feature of the invention is to provide a simple and reliable means for detecting the passing of a tape in a recorder-transcriber.

Another object of this invention is to provide a highly accurate means for sensing the passing of spaced indicia on a recording tape or the like and for indicating such passing on a visible indicator or counter.

Another object of the invention is to provide a simple and reliable mechanism for indicating the amount of dictated but untranscribed tape in a recorder-transcriber.

Basically these objects are accomplished by providing indicia, such as holes, preferably at evenly spaced intervals on the tape and detecting the passing of these indicia in a predetermined tape directional mode. Signals, representing these indicia passing in a prescribed mode, are transmitted to means for indicating total transcribed tape, dictated but untranscribed tape, or for other measurements. When total transcribed tape is counted, which gives an indication of a secretary's total transcription for a particular period, the counter is energized only when unlistened to tape is being moved in the secretary-forward directional mode. That is, tape which has been reversed by the secretary is not counted as it is again moved forward. In the preferred form this means includes a latching circuit which blocks a signal representing an indicium passing in the secretary-forward directional mode if this indicium was previously passed in the secretary-reverse directional mode. Since the inertia of the moving tape often carries an indicium of the tape past a detecting means after a directional control signal has been terminated, holding means are provided to keep the detecting means energized for a short period sufficient to allow the tape to come to rest in order to detect all indicia.

Another object of the invention is to provide a signalling device which can mechanically trigger a switch for transmitting a signal upon the amount of untranscribed tape in a recorder-transcriber reaching some predetermined percent of its capacity.

DESCRIPTION OF THE PREFERRED EMBODIMENTS

Figure 1:
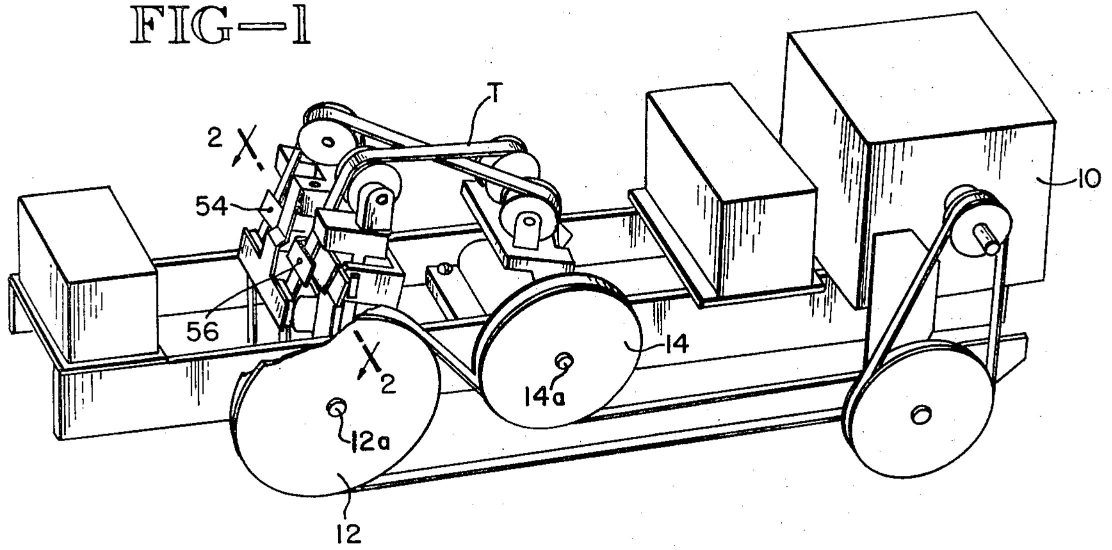
FIG. 1 is an isometric of a portion of a recordertranscriber embodying the principles of the invention.
Figure 3:
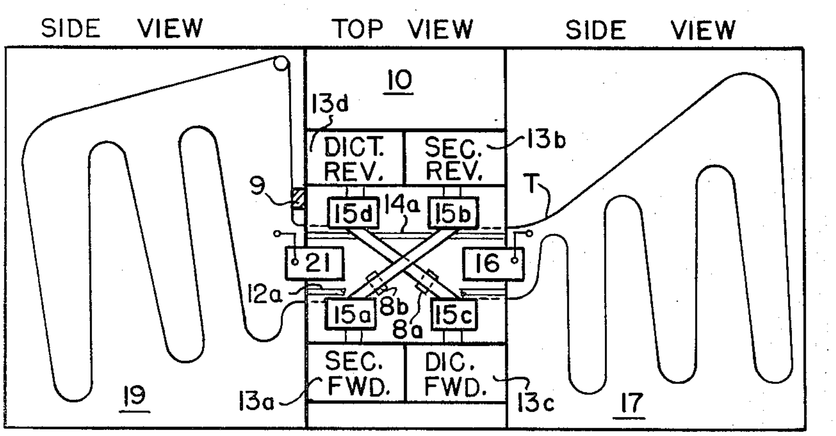
FIG. 3 is a diagrammatic illustration of an endless tape recorder-transcriber.
Figure 4:
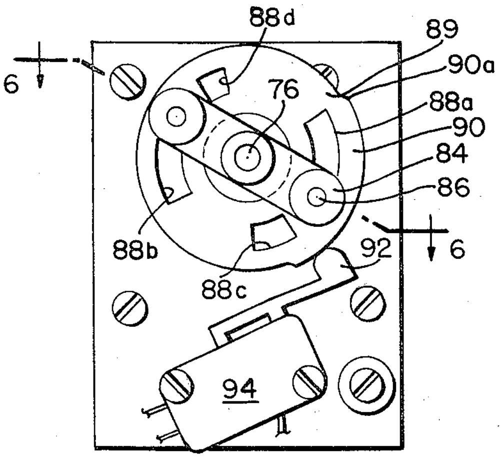
FIG. 4 is an end elevation of the differential assembly shown in FIG. 5 and used with the recorder-transcriber of FIG. 1.
Figure 2:
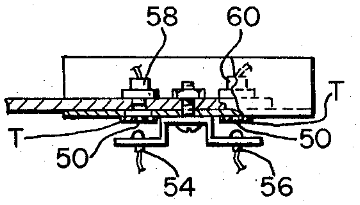
FIG. 2 is a fragmentary section taken along the line 2—2 of FIG. 1.

As best shown in FIGS. 1 and 3 the recorder-transcriber includes a tape drive means comprising a motor 10 coupled to a forward drive pulley 12 having a capstan 12*a* and a reverse drive pulley 14 having a capstan 14*a*. The tape is moved first across an erase magnet 9, which is operable to erase only when the tape is drawn across it when dictating but not when listening during playback, and then passes a conventional dictate/listen head 8*a*. The tape is then moved across a conventional transcribe head 8*b*. As is well known, on the secretary side of the machine an endless tape T is driven in the forward direction by a secretary controlled solenoid (secretary-forward) 13*a* which engages the tape between a pinch roller 15*a* and the capstan 12*a*. The tape is moved in the reverse direction by the secretary energizing a solenoid (secretary-reverse) 13*b* which moves a pinch roller 15*b* to pinch the tape between the pinch roller and the capstan 14*a*. The dictate side of the recorder-transcriber is operated on the endless tape in a like manner by dictator control of the dictate-forward-solenoid 13*a* and a dictate-reverse solenoid 13*d* which respectively move pinch rollers 15*c* and 15*d* to pinch the tape between the rollers and the respective capstans 12*a* and 14*a*. The recorder transcriber tape bin is divided into two sections, namely, a transcriber section 17 and a dictate section 19 as in U.S. Pat. No. 2,988,604. A bin switch 16 is provided in the transcriber section and a bin switch 21 is provided in the dictate section. These bin switches will be raised by the loop of the tape T drawing tight. In normal operation of the recorder-transcriber, lifting the bin switch in the transcriber section indicates that the secretary has transcribed all of the tape that has been dictated. Lifting the bin switch in the dictate section indicates that the dictator has used all of the tape available for dictation and prevents further energization of the dictate forward solenoid. Further energization of the secretary-forward solenoid after its respective bin switch has been raised will cause both the dictate-forward and secretary-forward solenoids to be energized simultaneously so that tape is continued to be moved but each side at the same speed so that the loop is not drawn tighter. As will be described in more detail below, the bin switch on the transcribe section controls energization of a light mounted at the secretary station. This light is de-energized when all but about ten seconds of dictated tape has been transcribed.

Figure 7:
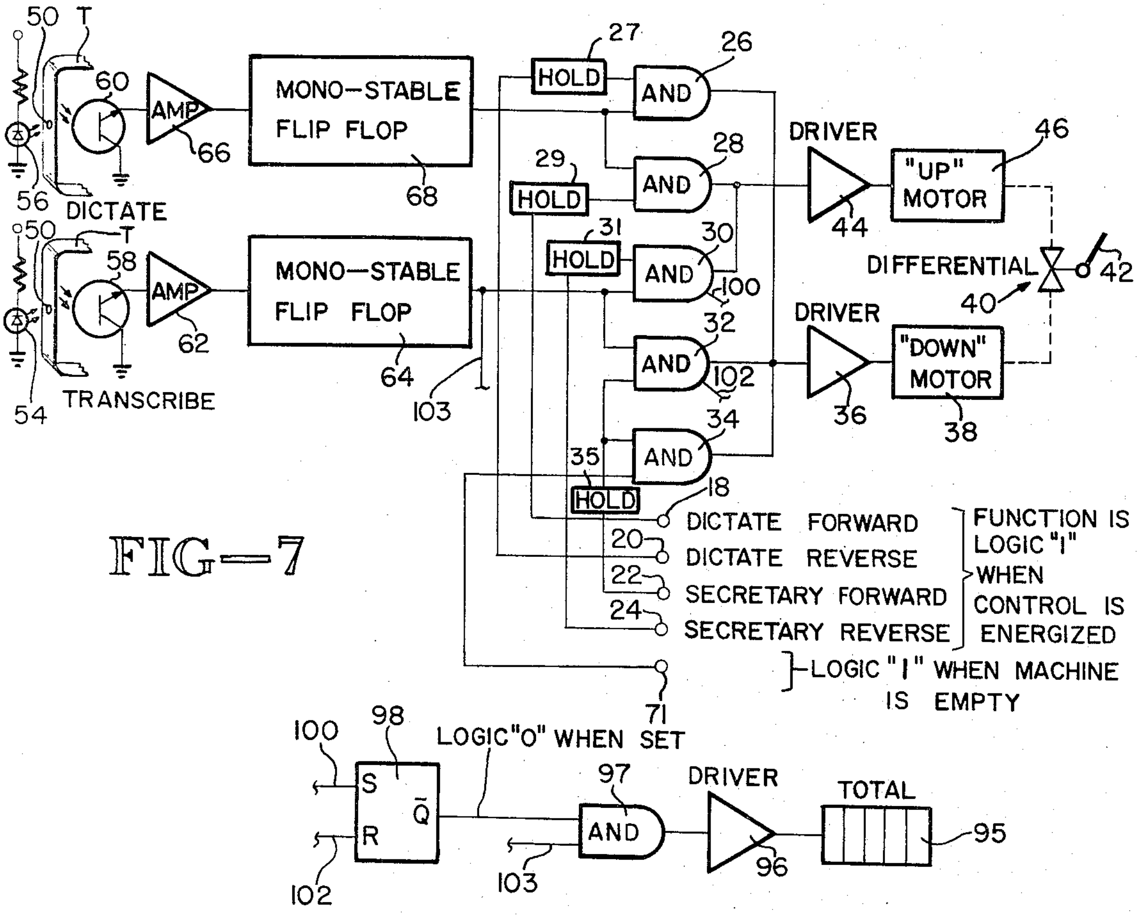
FIG. 7 is a logic schematic illustrating one technique for carrying out the principles of the invention.
Figures 5, 6:
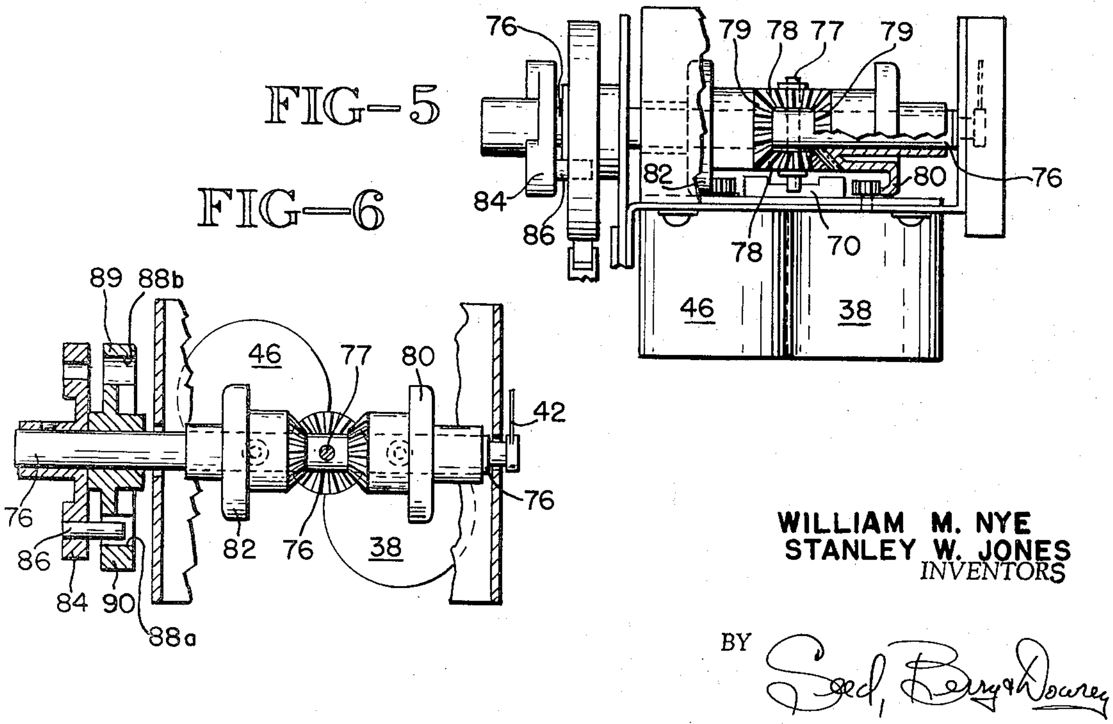
FIG. 5 is a plan view of a differential assembly used with the recorder-transcriber of FIG. 1.
FIG. 6 is a front elevation view of the differential assembly of FIG. 5.

Energization of the tape directional solenoids is caused by directional control signals from the secretary or dictator either or both of which may be located a distance from the recorder-transcriber. In the preferred embodiment these directional control signals are combined with tape passing signals or pulses to determine the amount of tape passing in a particular directional mode. As shown in FIG. 7 the terminal which receives the directional control signals indicating dictate-forward is identified as 18; dictate-reverse as 20; secretary-forward as 22; and secretary-reverse as 24. In the preferred embodiment of the invention the terminals 18, 20, 22 and 24 are normally at a negative potential 24 volts. The polarity, of course, may be varied depending on the design of the equipment. When one of the directional controls is energized the terminal energized is grounded (positive ground). The terminals are connected through HOLD circuits to AND gates in the following sequence: 18 is connected to AND gate 28 through HOLD circuit 29, 20 is connected to AND gate 26 through HOLD circuit 27, 22 is connected to AND gates 32 and 34 through HOLD circuit 35, and 24 is connected to AND gate 30 through HOLD circuit 31. The outputs from AND gates 26, 32 and 34 are connected to driver 36 which may transmit a pulse to a "down" stepping motor 38. The "down" stepping motor is connected to one end of a differential assembly 40. The differential assembly 40 is connected to a dial type indicator pointer 42. The output from gates 28 and 30 is connected to a driver 44 which sends pulses to an "up" stepping motor 46. The "up" stepping motor 46 drives the opposite end of the differential assembly. Energization of the "down" motor 38 will move the indicator pointer 42 in a downwardly direction towards zero. Zero on the indicator disclosed indicates that there is no dictated but untranscribed tape remaining in the recorder-transcriber. Energization of "up" motor 46 drives the indicator upwardly toward the maximum capacity mark, such as 100 percent. When the indicator points to the 100 percent mark all of the available tape in the machine has been used by the dictator. The "up"and "down" stepping motors produce approximately 6° rotation of the input geats 80 and 82 to the differential assembly which through the two to one ratio of the differential turns the indicator pointer 42 3° for each pulse.

Having provided the directional signals into the various AND gates it is now apparent that a signal, indicating the passing of tape in either the secretary or dictate side of the recorder-transcriber, arriving simultaneously at a particular gate with a directional signal will trigger one of the drivers to energize the "up" and "down" motors. The tape T in the preferred embodment is provided with punched holes 50 located in evenly spaced increments, such as, increments equivalent to one minute or one percent of the length of tape. The evenly spaced distances between the holes may be varied if desired to measure longer or shorter time increments. Other types of indicia such as magnetic coating, colored spots, or the like may also be used. The punched holes, however, are preferred as they advantageously provide a very simple technique for indicating the passing of tape. A light source, such as a light emitting diode 54, is provided on the secretary side of the bin and a light emitting diode 56 is provided on the dictate side. Photocells or photo transistors 58 and 60 are aligned opposite the respective diodes 54 and 56. When a hole 50 passes between the diode 54 and the photo transistor 58 on the secretary's side, the light through hole 50 to 58 sends a pulse to an amplifier 62 which passes a signal to a monostable flip flop 64 which transmits a 100 millisecond positive pulse to the gates 30 and 32. If the secretary-reverse solenoid is energized, AND gate 30 will have a positive potential from terminal 24 simultaneously with the pulse from the flip flop 64 and will therefore transmit a pulse to the driver 44 to rotate the indicator pointer 42 up 1 percent or one step. Since the recorder-transcriber cannot be in both the secretary-reverse and secretary-forward modes simultaneously, the AND gate 32 will see a negative potential from the terminal 22 and thus will not pass the 100 millisecond pulse. If the secretary is moving the tape in the secretary-forward direction, AND gate 32 will pass the pulse from flip flop 64 to driver 36 to move the indicator pointer down 1 percent or one step and AND gate 30 will not pass a pulse since it will see a negative potential from terminal 24. Thus it is readily apparent that the passing of a hole on the secretary side of the recorder-transcriber will move the indicator pointer in the "up" direction when the tape is being reversed by the secretary and will move the indicator pointer 42 in the "down" direction when the tape is being moved in the forward direction by the secretary.

On the dictate side of the machine the same operation takes place. Passing of a hole 50 between the diode 56 and the transcriber 60 will send a pulse to an amplifier 66 which passes the pulse to a mono-stable flip flop 68. The output of the flip flop 68 is 100 millisecond positive pulse which is transmitted to the AND gates 26 and 28. If the dictate-forward solenoid is energized the AND gate 28 will pass the pulse to the driver 44 whereas if the dictate-reverse solenoid is being energized the gate 26 will pass the pulse to the driver 36. It is thus apparent that the indicator pointer 42 is moved in the "up" direction in the dictate-forward mode and in the "down" direction in the dictate-reverse mode.

Occasionally reversal of the tape by either the dictator or secretary will not be of long enough duration to place a hole 50 between a diode and a photo transistor. As a result the indicator 42 will sometimes lead or sometimes lag the actual condition of the tape. That is, on infrequent occasions the indicator pointer will not reach zero even though all of the dictated tape has been transcribed or will reach zero prior to the time when the tape has all been transcribed. These variations are quite infrequent and seldom amount to more than a percent or two. It is desirable however to bring the indicator pointer 42 to zero each time the secretary has emptied the machine to avoid having this slight error accumulate. For this purpose stop 70 is provided to mechanically stop the indicator pointer 42 when it reaches zero prior to the end of the untranscribed tape. In this condition further "down" pulses from the "down"motor 38 will be unable to move the indicator beyond zero. If the indicator pointer 42 lags the tape, that is, the tape is all transcribed but the indicator pointer does not read zero, the "down" motor 38 will be further stepped by pulses from AND gate 34 in the manner now to be described. In the preferred embodiment a transcriber light circuit is connected to a terminal 71. The light circuit is energized, that is the light is on, when there is more than 10 seconds of untranscribed tape in the recorder-transcriber and terminal 71 is at −24v. The terminal 71 is grounded, however, when the light is off incidating no more than 10 seconds of tape remains to be transcribed. In the normal operation of a recorder-transcriber when the secretary sees the transcriber light go off she realizes that there is still up to 10 seconds of untranscribed work on the tape. In order to finish transcribing the material remaining on the tape the transcriber will normally energize the secretary-forward solenoid four or five times. Each time the terminal 22 receives a positive pulse when terminal 71 is grounded (light off) the gate 34 will transmit a pulse to the driver 36 which moves the indicator pointer in the "down" direction thus zeroing the pointer.

The total indicator 95 is powered by a driver 96 which receives pulses from AND gate 97. AND gate 97 passes a pulse when it simultaneously receives a pulse through line 103 from the transcribe flip flop 64 and a ground from latching circuit 98 in the reset condition. Latching circuit 98 is connected by line 100 to AND gate 30 and is set, which makes $\bar{Q}$ output negative, when a pulse is transmitted from AND gate 30 indicating a hole passing between light 54 and photo transistor 58 in the tape reverse direction. By setting the latching circuit the next hole detected by photo transistor 58 in the tape forward direction (normally the same hole previously reversed and now returned when the secretary is re-listening to the tape) will be transmitted from AND gate 32 through line 102 and reset the circuit 98 making the line between 98 and 97 logic "1," i.e., grounded. The latching circuit 98 is arranged so that it is set by the beginning of a pulse on line 100 and reset by the end of the pulse on line 102. This way the forward pulse which resets latching circuit 98 will never get through to AND gate 34. The next hole detected with the tape moving forward will cause a pulse to pass from flip flop 64 through line 103 and AND gate 97 triggering the gate to pass a pulse to the driver 96. Thus the total indicator 95 will normally be energized only when unlistened to tape is passing in the secretary-forward direction.

If a hole passes between a light 54 or 56 and a detecting transistor 58 or 60 after the dictator or secretary has terminated a directional control signal due to the inertia of the moving tape, the voltage on the associated terminal 18, 20, 22 or 24 will return to −24v. thus precluding energization of the "up" or "down" motor. To prevent this, HOLD circuits 27, 29, 31 and 35 are provided to hold the ground on the energized terminal for a time sufficient to allow the tape to come to rest so that all holes are counted.

Figure 8:
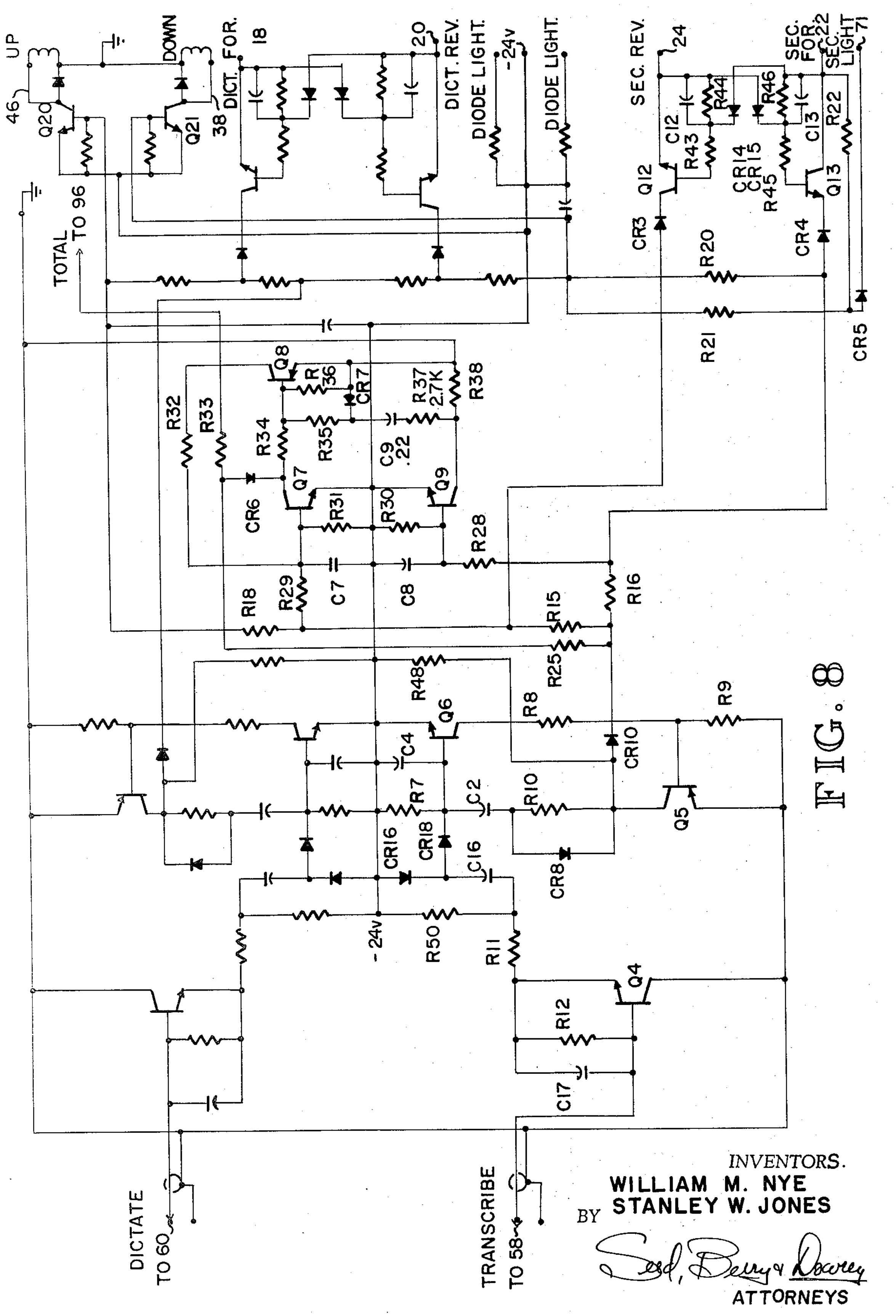
FIG. 8 is an electrical schematic of the preferred embodiment.

For a more detailed description of an operation of the circuit, reference is made to FIG. 8. Looking first at the transcribe side of the circuit, a hole 50 on the tape passing between the light source 54 and the light sensing transistor 58 will permit the transistor to conduct passing a positive pulse to the base of Q4 allowing that transistor to conduct. Conduction of Q4 will charge capacitor C16. When capacitor C16 has been charged sufficiently it will cause a voltage drop across R7 to turn on Q6. Q6 will conduct turning on Q5 which produces a ground or zero volts at its collector. This ground passes through R10 to charge capacitor C2 keeping Q6 on. After approximately 100 milliseconds capacitor C2 is charged and current flow stops which turns off Q6. Q6 is thus turned off removing the ground at the collector of Q5. The 100 millisecond ground pulse is transmitted through diode CR10 to the junction of resistors R15, R16 and R25.

Assuming first that the secretary has energized the secretary-forward solenoid then the hole 50 detected is on tape moving in the forward direction. The ground or positive potential on terminal 22 will be passed through diode CR14 and resistor R43 to turn on Q12 allowing the −24v. on secretary-reverse terminal 24 to pass through transistor Q12 and diode CR3 to resistor R15. This −24v potential will short the path between R15 and the transistor Q20. Q13 will remain off so that the 100 millisecond pulse will pass through R25 and R33 energizing driver 96 to move the total indicator 95 ahead one number. The 100 millisecond pulse will also pass through R16 and R20 to turn on Q21 and energize the "down" motor 38. When the secretary terminates the signal to the secretary-forward terminal 22, C12 will discharge, holding Q12 on for a length of time sufficient to allow the tape to come to rest. Thus if any holes are detected during this period they will be counted by the totalizer 95 and will energize the "down" stepping motor 88.

If the secretary reverses the tape in order to listen to the tape for a second time, the secretary-reverse terminal 24 will be placed at ground and the secretary-forward terminal 22 will be −24v. A hole detected passing in the reverse direction will again trigger Q5 to produce a 100 millisecond pulse at the junction of R15, R16 and R25. Q13 will be turned on since its base will be connected to the positive potential on terminal 24 thus shorting the positive pulse from R16 and preventing operation of the "down" stepping motor 38. Q12 will not be conducting, however, thus allowing the pulse to pass through R15 and R18 to the "up" stepping motor 46. As was mentioned earlier, however, the pulse will not be permitted to pass to energize the total indicator 95.

The 100 millisecond pulse is prevented from energizing the total indicator 95 since it also passes through R29 turning on Q7. Q7 will conduct and short the pulse passing through R25 to the totalizer 96 through diode CR6 to the −24v. line. The base of Q8 will be made negative which will provide a latching circuit between Q8 and Q7. Q7 and Q8 will remain latched until the next pulse from Q5 is transmitted simultaneously with the application of a positive voltage on the secretary-forward terminal 22. This occurs, for example, after the secretary has backed up past a hole and has then energized the secretary-forward solenoid to listen to this tape. When the hole that has been previously detected in the secretary-reverse mode is again detected in the secretary-forward mode it will energize the "down" motor 38 thus off-setting the previous pulse to the "up" motor 46 and the pulse will also pass through R28 to the base of Q9 turning on Q9. As Q9 conducts through R38, C9 becomes charged during the 100 millisecond pulse. Q9 turns off at the end of the 100 millisecond pulse thereby allowing C9 to discharge, the current to dischrage C9 coming from the base of Q8 through R35. This momentarily turns Q8 off which unlatches the Q8–Q7 pair. With Q7 and Q8 unlatched the next hole detected by the transistor 58 in the secretary-forward direction will pass to energize the total indicator 95.

The dictate side of the circuit operates the same as the secretary side with the exception that none of the pulses is sent to the totalizer 95 but only to the "up" and "down" motors. It should be understood however that a dictation totalizer may be employed in the same manner as the transcription totalizer 98, if desired.

The differential assembly includes a shaft 76 secured at one end to the pointer 42 and passing out of the assembly at its opposite end. The shaft is rotated by a pin 77 that is journalled in two opposed bevel gears 78. The bevel gears 78 mesh with two mating opposed bevel gears 79 which are driven independently by driven gears 80 and 82. Each of the driven gears 80 and 82 is driven by a pinion coupled to a respective stepping motor 38 or 46.

The signalling device of the invention includes a cam driver 84 secured to the free end of the shaft 76. The driver pin 86 is secured to one end of the cam driver 84; however, it may be in the alternative placed at the opposite end of the cam driver. The driver pin seats in a slot 88*a* of a cam 89 which is journalled on the shaft 76. Three other slots of various lengths are provided, namely, 88*b*, 88*c* and 88*d*. The slots provide a "lost motion" connection between the cam 89 and pin 86 and range respectively in lengths corresponding to 20 percent, 10 percent, five percent, and zero percent of recorder-transcriber tape capacity. Rotation of shaft 76 to move the pointer 42 "up" and "down" on the dial moves the driver pin 86 a corresponding amount. When the pin 86 is at one end of the slot 88a cam 89 is also rotated, however, if the direction of shaft rotation is reversed, th pin unseats from the end of the slot and the cam receives no further rotation until the pin again seats against the other end of the slot.

The cam 89 is provided with a lobe 90 having a forward ramp 90a. A switch actuator 92 rides on the cam and positions a switch 94 in the open or closed condition. The switch is open when the actuator is on the lobe 90 but is closed when the actuator is off the lobe. The switch is thus operative to produce a signal which indicates some predetermined percentage of capacity of the recorder-transcriber. In the preferred form the cam lobe will engage the actuator when the pointer 42 is indicating that the recorder-transcriber is at 80 percent capacity, that is, 80 percent of the tape has dictated but untranscribed work on it. This signal then is used to condition external switching circuits, not shown, to perform various functions, such as, to place the recorder-transcriber in "standby" so that it will be available for additional dictators only when all other recorder-transcribers are at capacity. If desired, a percent of capacity other than 80 percent may be used merely by adjusting the position of the cam on the shaft 76.

The pin 86 is approximately of a diameter equal to the length of the slot 88*d*; therefore, in the slot there is a negligible amount of lost-motion. The pin is coupled to slots 88*b* and 88*d* by placing it at the opposite end of the cam driver 84. When placed as shown in slot 88*a* the switch 94 will be actuated when the recorder-transcriber reaches 80 percent of capacity and will remain actuated until the pin travels the length of the slot (dropping to 60 percent of the machine capacity) to again move the cam. During this period the secretary will have transcribed 20 percent of the work on the tape and thus the recorder-transcriber will have regained sufficient capacity to again accept additional dictators.

It is readily apparent that several unique features of a recorder-transcriber have been described. It should be understood that the details of the circuitry employed are not necessary for an understanding of the invention and that no limitations of the preferred form described are implied. It should also be apparent that changes in the details of the disclosed embodiments may be made by one skilled in the art and therefore the scope of the invention is to be limited solely by a broad interpretation of the claims appended hereto.

The invention in which an exclusive property or privelege is claimed is defined as follows:

1. Apparatus for counting increments of the amount of tape moving in a recorder-transcriber or the like, comprising:

a tape having a plurality of periodically repetitive substantially similar indicia speed at periodic uniform intervals along the length of said tape and corresponding to substantially uniform increments of tape to be measured;

means responsive to a first control signal to move the tape in a forward direction relative to a location and responsive to a second control signal to move the tape in a reverse direction relative to said location;

indicia responsive means disposed at said location for producing an indicium signal in response to the passing of each of said indicia on tape moved in either direction past said location by said tape moving means;

indicator means providing a tape movement indication and selectively operative to incrementally change said indication by a fixed amount either in a first direction or in a second direction; and said indicator means connected to be responsive to the concurrent occurrence of a transmitted indicium signal and said first control signal to change the indication said fixed amount in said first direction and responsive to the concurrent occurrence of a transmitted indicium signal and said second control signal to change the indication said fixed amount in said second direction.

2. The apparatus of claim 1 wherein said indicia are apertures in the tape and said indicia responsive means includes a light source on one side of the tape and a light sensor on the opposite side.

3. The apparatus of claim 1 wherein said tape moving means includes transcribe-forward and transcribe-reverse tape moving means operable responsive to said first and second control signals, respectively; and further including a tape transcribed total indicator operable in response to said indicia signals transmitted concurrently with said first control signal for indicating total movement of tape moved in the transcribe-forward direction; circuit means operative in response to an indicia signal transmitted concurrent with said second control signal to assume a disable signal condition rendering said total indicator inoperative; said circuit means being operative in response to said first control signal to terminate said disable signal condition whereby said total indicator is again operative.

4. The apparatus of claim 1, additionally comprising holding means in circuit with the operative connection with each of said control signals and said indicator means, said holding means operative in response to termination of a said control signal to delay termination of the control signal to said indicator means for a certain time period sufficient for tape motion to cease, so that said indicator means is responsive to an indicium sensed by tape movement after termination of the said control signal.

5. The apparatus of claim 1 wherein said tape moving means includes transcribe-forward tape moving means responsive to said first control signal and transcribe-reverse tape moving means responsive to said second control signal, so that said indicator means is operative to provide said change of indication in one said direction in response to indicia signals in the transcribe-forward direction and to provide said change of indication in the other said direction in response to indicia signals in the transcribe-reverse direction.

6. The apparatus of claim 5 wherein said tape moving means includes dictate-forward tape moving means responsive to a third control signal and dictate-reverse tape moving means responsive to a fourth control signal, said indicator means is operative to change said tape movement indication in said second direction responsive to either said first control signal or said fourth control signal and indicia signals transmitted either during transcribe-forward tape movement or dictate-reverse tape movement, and said indicator means is operative to change said tape movement indication in said first direction responsive to either said second control signal or said third control signal and indicia signals transmitted either during transcribe-reverse tape movement or dictate-forward tape movement.

7. The apparatus of claim 5 wherein said indicator means includes a differential drive assembly having first and second differential inputs and an output, separate unidirectional "up" and "down" drive means respectively connected to said first and second differential inputs, said "down" drive means operative to drive the first differential input a fixed amount in response to said first control signal and an indicia signal transmitted during transcribe-forward tape movement, said "up" drive means operative to drive the second differential input a fixed amount in response to said second control signal and an indicia signal transmitted during transcribe-reverse tape movement, and said output operative to indicate the difference between said first and second differential inputs.

8. The apparatus of claim 7, wherein:

said tape moving means includes dictate-forward tape moving means responsive to a third control signal and dictate-reverse tape moving means responsive to a fourth control signal, and wherein:

said "up" drive means is responsive to the concurrent occurrence of said indicium signal and either said second control signal or said third control signal to drive the first differential input; and said "down" drive means is responsive to the concurrent occurrence of said indicium signal and either said first control signal or said fourth control signal to drive the second differential input.

9. The apparatus of claim 8 further including means for sensing the depletion of tape required to be transcribed and for providing a tape depletion signal in response to said sensed depletion;

said "down" drive means responsive to the simultaneous occurrence of said tape depletion signal and said first control signal to drive said second differential input.

10. The apparatus of claim 8 wherein said indicia are apertures in the tape and said indicia responsive means includes a light source on one side of the tape and the light sensor on the opposite side.

11. The apparatus of claim 8 wherein said means for sensing the passing of indicia includes a first sensor sensing indicia passage caused by said dictate-forward and dictate-reverse tape moving means; and a second sensor sensing indicia passage caused by said transcribe-forward and transcribe-reverse tape moving means.

12. A signalling device for signalling when the amount of recorded but untranscribed tape in a recorder-transcriber has reached a predetermined percentage of the maximum tape capacity of the recorder-transcriber, comprising:

means for producing a signal;

first means for selectively moving the tape past a dictate location;

second means for selectively moving the tape past a transcribe location;

first means for sensing the amount of tape moved by said first moving means;

second means for sensing the amount of tape moved by said second moving means;

means responsive to said first and second sensing means for movement in an amount proportional to the difference between the amount of tape dictated and the amount of tape transcribed; and means mechanically coupled to said proportional movement means for actuating said signal producing means in response to the amount of dictated but untranscribed tape reaching a predetermined percentage of the maximum amount of tape in said recorder-transcriber.

13. The device of claim 12, wherein said proportional movement means includes a differential assembly having a shaft and being operable to rotate said shaft an amount proportional to dictated but untranscribed tape movement, cam driver means secured to said shaft, a cam rotatably mounted for movement by said cam driver, said actuating means including a switch actuator mounted for engagement by said cam in response to a predetermined amount of cam rotation in a first direction caused by said predetermined percentage of dictated but untranscribed tape, and said signal producing means including a switch operated by said actuator.

14. The device of claim 13 wherein said proportional movement means includes a lost-motion connection operatively disposed between said cam driver means and said cam to impart said movement to said cam, said lost-motion connection being operative in response to rotation of said cam driver means by said shaft in a second direction resulting from a reduction in said amount of dictated but untranscribed tape to return said cam to its position not engaging said switch actuator only after a certain extend of lost-motion has been taken-up by a predetermined amount of said second direction rotation, whereby said signal producing means remains actuated until said cam driver means and said shaft of said proportional movement means have returned to a position corresponding to a percentage of the dictated but untranscribed tape less than said predetermined percentage.

15. The device of claim 14 wherein said lost-motion connection includes at least one slot in said cam, and a pin positioned in lost-motion relation in said slot and connected to said cam driver means.

16. Apparatus for counting increments of tape moving in a recorder-transcriber or the like, comprising:

a tape having a plurality of periodically repetitive substantially similar indicia spaced at periodic uniform intervals along the length of said tape and corresponding to substantially uniform increments of tape to be measured:

first tape movement means selectively operative to move said tape in either a forward or reverse direction;

second tape movement means selectively operative to move said tape in either said forward or reverse direction;

first indicia responsive means disposed to produce an indicia signal in response to the passage of each said indicia on tape moved by said first tape movement means;

second indicia responsive means disposed to produce an indicia signal in response to the passage of each said indicia on tape moved by said second tape movement means; and indicator means providing a tape movement indication and selectively operative to change said indication by fixed increments either in a first direction or in a second direction;

said indicator means being operative to change said indication by an increment in the first direction either in response to each indicia signal produced by said first indicia responsive means during tape movement in said forward direction or in response to each indicia signal produced by said second indicia responsive means during tape movement in said reverse direction; and said indicator means being operative to change said indication by an increment in the second direction either in response to each indicia signal produced by said first indicia responsive means during tape movement in said reverse direction or in response to each indicia signal produced by said second indicia responsive means during tape movement in said forward direction, so that said indicator means continuously indicates the net amount of tape moved in the forward direction by said first tape movement means but not moved in the forward direction by said second tape movement means.

17. Apparatus as in claim 16, further comprising:

dictate control means selectively operative to apply a dictate-forward control signal and a dictate-reverse signal to control said first tape movement means for said tape movement in said forward and reverse direction, respectively;

transcribe control means selectively operative to apply a transcribe-forward control signal and a transcribe-reverse control signal to control said second tape movement means for said tape movement in said forward and reverse directions, respectively;

said indicator means operative to incrementally change in said first direction either when said dictate-forward control signal coincides with an indicia signal produced by said first indicia responsive means or when said transcribe-reverse control signal coincides with an indicia signal produced by said second indicia responsive means; and said indicator means additionally operative to incrementally change in said second direction either when said dictate-reverse signal coincides with an indicia signal produced by said first indicia responsive means or when said transcribe-forward control signal coincides with an indicia signal produced by said second indicia responsive means.

18. Apparatus as in claim 16, further comprising:

signal means connected to be responsive to said indicator means to provide a signal when said indication of the net amount of tape exceeds a first predetermined amount of tape.

19. Apparatus as in claim 18, wherein:

said signal means is operative to continue providing said signal in response to the indication of said indicator means until said indiction of net amount of tape is reduced to a second predetermined amount of tape less than said first predetermined amount of tape.

* * * * *